(No Model.)

M. B. KOERPER.
FRICTION PULLEY.

No. 469,640. Patented Feb. 23, 1892.

WITNESSES.
Matthew M. Blunt,
Edward S. Day

INVENTOR.
Michael B. Koerper
by Frank S. Parker Atty.

UNITED STATES PATENT OFFICE.

MICHAEL B. KOERPER, OF LITTLE ROCK, ARKANSAS, ASSIGNOR TO FREDERICK S. STRONG AND FREDERICK C. MANN, OF EAST BRIDGEWATER, MASSACHUSETTS.

FRICTION-PULLEY.

SPECIFICATION forming part of Letters Patent No. 469,640, dated February 23, 1892.

Application filed August 28, 1891. Serial No. 404,002. (No model.)

*To all whom it may concern:*

Be it known that I, MICHAEL B. KOERPER, of Little Rock, in the county of Pulaski and State of Arkansas, have invented certain new and useful Improvements in Friction-Pulleys, of which the following, taken in connection with the accompanying drawings, is a specification.

My invention relates to that class of adjustable friction-pulleys in which one pulley of the pair has a grooved periphery adapted to receive the double-beveled periphery of its mate, the object being to so arrange the parts of the pulley in relation to each other that by a single movement of one of the parts an adjustment can be effected. This object I attain by the mechanism shown in the accompanying drawings, in which—

Figure 1:
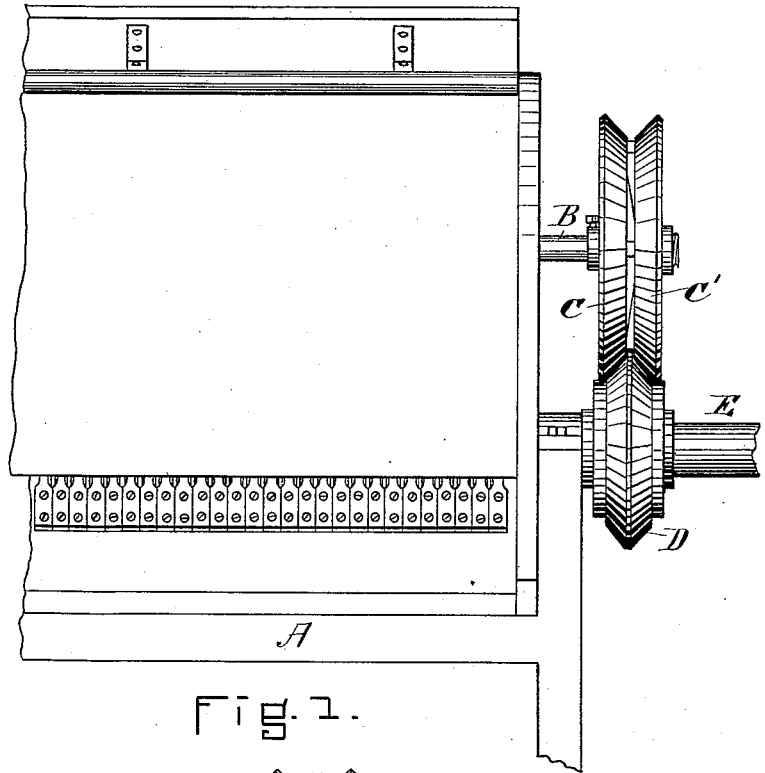
Figure 2:
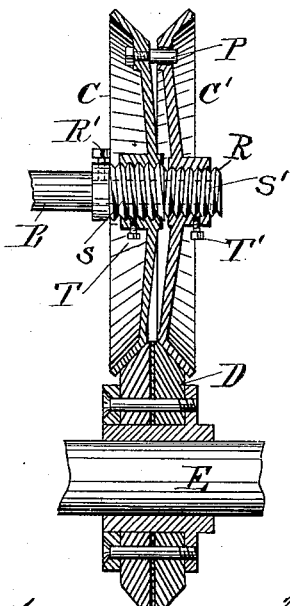

Figure 1 is an elevation showing my improved friction-pulleys applied to a cotton-seed linter, a part of the linter being shown. Fig. 2 is a section taken through the pulleys.

In the drawings, let A represent the cotton-seed linter, or instead of a linter any machine may be substituted, as my invention is applicable to a great variety of machines.

The main shaft E is provided with a double-beveled pulley D, the periphery of which engages with the compound pulley C C', mounted on the shaft B. This compound pulley C C' is made in two parts, as shown in Fig. 2, the part C having a pin P attached to it which passes loosely through a hole made in the part C', as shown in Fig. 2. This pin P prevents the parts C and C' from rotating independently of each other—that is, they must rotate together—although they are free to be moved away from or toward each other.

R is a quill made fast by a set-screw R' to the shaft B. This quill R has upon it a two-screw-threaded portion S and S', one portion being a right-hand screw and the other portion a left-hand screw. The screws S and S' engage with corresponding internal screws formed in the hubs of the parts C and C'.

From the above it will be readily understood that if the quill R is held stationary and the pulley C C' rotated then the parts C and C' will be drawn toward each other or forced apart according to the direction turned. When the pulley has been turned sufficiently to get the desired adjustment, then it is held in place by the set-screws T T'.

To prevent the screws T T' from injuring the threads of the screws on the thimble or quill R, a piece of soft metal or other suitable material may be inserted between the bottom of the screw and the threads of the screws on the thimble or quill.

The operation of my device is as follows: If it is found that the pulleys bind one on the other, so as to produce an unnecessary friction, then the pulley C C' is turned on the quill R, until the parts are separated, so that just the amount of friction required is maintained. If, on the other hand, there is not enough friction, then the pulley C C' is turned until the parts C and C' are brought together sufficiently to cause the desired amount of friction.

I claim—

In a friction-clutch device, the combination of a double-beveled or convex periphery pulley D with a compound pulley C C' and right and left hand screw-quill R, all adapted to operate together substantially as and for the purpose set forth.

In testimony whereof I have signed my name to this specification, in the presence of two subscribing witnesses, on this 3d day of August, A. D. 1891.

MICHAEL B. KOERPER.

Witnesses:
E. E. JENKINS,
M. R. DENIE.